Patented June 5, 1934

1,961,736

UNITED STATES PATENT OFFICE 1,961,736

PROCESS OF FORMING ACETIC ACID FROM METHANOL AND CARBON MONOXIDE

Joseph C. Carlin, Nashville, Tenn., and Norman W. Krase, Urbana, Ill., assignors to Tennessee Products Corporation, Nashville, Tenn., a corporation of Tennessee No Drawing. Application July 18, 1929,
Serial No. 379,312

5 Claims. (Cl. 260—116)

This invention relates to methods and means for the formation and manufacture of acetic acid.

One of the principal objects is to enable acetic acid to be formed from methanol and carbon monoxide.

Another object of the invention pertains to a process for converting an aliphatic alcohol to the next higher acid in the same chemical series by the use of heat and pressure.

Another object of the invention relates to a process for converting an alcohol to the next higher acid in the same chemical series by the application of heat and pressure in the presence of a selected catalyst.

Other objects and advantages other than those hereinbefore mentioned will be specifically pointed out or will be apparent from the discussion and description herein given.

The invention resides substantially in the combination, sequential arrangement and relative application of steps or parts of steps as will be fully indicated hereinafter.

Heretofore it has been shown that alcoholates such as sodium ethylate can be caused by proper treatment, to combine with carbon monoxide to yield a product which is a salt of the next higher acid in the same chemical series from which the original alcoholate is derived (e. g. sodium propionate). The present invention enables the same result to be attained by a novel and simplified process. It has been found that methyl-alcohol for example under certain conditions will react with carbon monoxide to form acetic acid without producing during such formation either an alcoholate or a salt of the acid so formed. By following the process according to the invention therefore it is possible to make commercial acetic acid on a large scale and at greatly reduced cost.

As an illustration of one manner of carrying out the process according to the invention, methyl-alcohol vapor and carbon monoxide gas are mixed and compressed under a high pressure. Usually this pressure is about 250 atmospheres, although it has been found that pressure between 50 and 400 atmospheres can be successfully used without departing from the scope of the invention. The subjection of the mixture to pressure is preferably effected at a selected temperature sufficiently high to prevent condensation of the alcohol vapor and is then passed at a selected velocity over a heated catalyst. As the gaseous mixture comes out of the catalyst tube it is passed through a condenser or is subjected to other means for causing condensation of the acetic acid vapor which has been formed. Thereafter the condensed vapor and gas are passed through a suitable device, trap or separator to separate the condensed acetic acid from the uncondensed gas or vapors which latter are mainly comprised of carbon monoxide and possibly methyl-ether. These uncondensed gases may be removed in any suitable manner, preferably in a continuous process by allowing them to expand through a suitable expansion valve till atmospheric or other desired pressure is attained.

If desired, instead of reducing the pressure of the uncondensed gases as above described the gases may be mixed with a predetermined amount of steam and then passed through a second catalyst tube containing a suitable catalytic agent for example alumina. The passage through the second catalyst tube causes any free methyl ether which may be present to react with the water vapor and regenerates methyl-alcohol as a vapor which is later condensed after the gases leave said second catalyst tube by any well known method of condensation. The methyl-alcohol which is thus regenerated may be reused in the process if desired. The liquid which is condensed and trapped out after the first catalyst tube is removed and contains as above described the acetic acid. If it is desired to concentrate this acetic acid any standard process of distillation may be used to accomplish this end.

As one example of a catalyst that has been found effective in the formation of the acetic acid may be mentioned that of syrupy phosphoric acid, although any other equivalent preferably dehydrating catalyst may be employed. This catalyst is preferably preheated to a temperature a little above that at which it is to be used in the catalyst tube. It is also desirable that the catalytic agent be exposed to the reacting gases over as large a surface as possible in order that a maximum of catalytic action may be obtained when the gases pass through the catalyst tube.

As an illustration of a preferred manner of effecting this, the phosphoric acid may be supported on various chemically inert solid substances which naturally spread and expose such phosphoric acid over a large surface. As specific examples of the various chemically inert solid substances that may be used for this purpose there may be mentioned silica gel or charcoal. While it is preferred to carry out the reaction between the methanol and carbon monoxide in the neighborhood of about 375° C. still the temperature might very well lie anywhere between 200° C. and 500° C. without in any way altering the beneficial and desirable results to be obtained.

It has been found that a mixture of carbon monoxide and carbon dioxide instead of carbon monoxide alone tends to reduce the formation of carbon in the catalyst tube by providing an over sufficiency of carbon monoxide. That is, the carbon dioxide provided, tends to combine with any free carbon that may be present to yield carbon monoxide $CO_2+C=2CO$. Other variations and changes apparent to those skilled in the art may be employed without departing from the spirit and scope of the invention. Furthermore, while carbon monoxide and carbon dioxide are used it will be understood that other gaseous mixtures containing carbon monoxide and carbon dioxide may be employed. It is also to be understood that the language contained in the following claims is intended to cover all of the generic and specific features of the invention herein described.

What we claim for Letters Patent is:

1. The process of forming acetic acid which consists in mixing an alcohol vapor and carbon monoxide under pressure and at a sufficiently high temperature to prevent condensation of said alcohol vapor, passing said mixture over a heated catalyst and thereafter condensing a portion of the gaseous mixture, then mixing with the remaining uncondensed portion a quantity of steam and passing said steam mixture over a catalyst to thereby regenerate methyl alcohol for reuse in the process.

2. The process of producing acetic acid from methanol which involves the formation of a mixture of methyl alcohol vapor and carbon monoxide gas, passing said mixture under pressure over a heated catalyst, condensing out the acetic acid formed, concentrating it by distillation, converting the by-product methyl ether which may be formed to methanol by mixing said methyl ether with steam at a temperature between 200 and 500° C. and pressure conditions between 50 and 400 atmospheres, passing it over a catalyst and condensing out the methanol for further use in the process.

3. The process of producing acetic acid from methanol which involves the formation of a mixture of methyl alcohol vapor and carbon monoxide gas, passing said mixture under pressure over a heated catalyst of syrupy phosphoric acid, condensing out the acetic acid formed, concentrating it by distillation, converting the by-product methyl ether which may be formed to methanol by mixing said methyl ether with steam at a temperature of about 375° C. and pressure conditions below 400 atmospheres and over 50 atmospheres, passing it over a catalyst of alumina, and condensing out the methanol for further use in the process.

4. The process of forming acetic acid which consists in combining methyl alcohol vapor and carbon monoxide gas under pressure, and at a sufficiently high temperature to prevent condensation of said alcohol vapor, passing said mixture over a catalyst of syrupy phosphoric acid spread upon a chemically inert solid substance, thereafter condensing out of said gaseous mixture the acetic acid contained therein as a condensate, mixing a quantity of steam with the remaining gaseous mixture, then passing the mixture of remaining gases and steam over a second catalyst to cause any free methyl ether present in said mixture to react with the water vapor contained therein to regenerate therein methyl alcohol as a vapor.

5. The process of manufacturing acetic acid from methanol which includes mixing the methanol with a mixture of carbon monoxide gas and carbon dioxide, then subjecting the resulting mixture to pressure in the presence of a catalyst and at a temperature sufficiently high to prevent condensation of the alcohol vapor, then condensing out from the gaseous mixture, any acetic acid vapor which has been formed therein, and finally subjecting remaining gaseous product to the catalytic action of alumina.

JOSEPH C. CARLIN.
NORMAN W. KRASE.